United States Patent
Magoshi (12)

(10) Patent No.: US 6,667,647 B2
(45) Date of Patent: Dec. 23, 2003

(54) LOW POWER CLOCK DISTRIBUTION METHODOLOGY

(75) Inventor: Hidetaka Magoshi, Foster City, CA (US)

(73) Assignee: Sony Computer Entertainment Inc. (JP)

(*) Notice: Subject to any disclaimer, the term of this patent is extended or adjusted under 35 U.S.C. 154(b) by 0 days.

(21) Appl. No.: 10/113,052

(22) Filed: Apr. 1, 2002

(65) Prior Publication Data

US 2002/0190775 A1 Dec. 19, 2002

Related U.S. Application Data

(60) Provisional application No. 60/297,940, filed on Jun. 13, 2001.

(51) Int. Cl.[7] .............................................. H03K 3/00
(52) U.S. Cl. ....................... 327/295; 327/297; 327/299; 375/220
(58) Field of Search ................................ 327/291–297, 327/299; 375/220, 296

(56) References Cited

U.S. PATENT DOCUMENTS

| | | | |
|---|---|---|---|
| 5,287,022 A | * | 2/1994 | Wilsher ........................ 327/310 |
| 5,911,063 A | | 6/1999 | Allen et al. |
| 5,923,188 A | | 7/1999 | Kametani et al. |
| 6,037,820 A | | 3/2000 | Ishizaka |

OTHER PUBLICATIONS

A. Kahn and H. Magoshi et al., "A 150MHz Graphics Rendering Processor with 256 Mb Embedded DRAM," ISSCC Digest of Technical Papers, pp. 150–151, Feb. 2001.

M. Mizuno et al., "Clock Distribution Networks with On–Chip Transmission Lines," Proceedings of the 2000 International Interconnect Technology Conference, pp. 3–5, 2000.

M. Mizuno et al., "On–chip multi–GHz Clocking with Transmission Lines," ISSCC Digest of Technical Papers, pp. 366–367, Feb. 2000.

Y. Ismail, E. Friedman and J. Neves, "Performance Criteria for Evaluating the Importance On–chip Inductance," Proceedings of the IEEE International Symposium on Circuits and Systems, pp. 244–247, May 1998.

P. Restle, et al., "A Clock Distribution Network for Microprocessors," IEEE J. Solid–State Circuits, vol. 36, No. 5, pp. 792–799. May 2001.

T. Xanthopoulos, et al., "The Design and Analysis of the Clock Distribution Network for a 1.2GHz Alpha Microprocessor," ISSCC Digest of Technical Papers, pp. 402–403, Feb. 2001.

N. Kurd, et al., "Multi–GHz Clocking Scheme for Intel Pentium4 Microprocessor," ISSCC Digest of Technical Papers, pp. 404–405, Feb. 2001.

K. Bernstein, et al., "High Speed CMOS Design Styles", Kluwer Academic Publishers, pp. 247–284, 1998.

P. Zarkesh–Ha and J. Mindl, "Asymptotically Zero power Dissipation Gigahertz Clock Distribution Network," IEEE 8th Topical Conference on Electrical Performance of Electronic Packaging, pp. 57–60, Oct. 1999.'1.

A. Chandrakasan, W. Bowhill and F. Fox, ed., "Design of High Performance Microprocessor Circuits," IEEE Press: Ch. 6, Models of Process Variations in Device and Interconnect, pp. 98–115; Ch. 13, Clock Distribution, pp. 261–281; and Ch. 17, Techniques for Driving Interconnect, pp. 352–377 (2001).

* cited by examiner

Primary Examiner—Timothy P. Callahan
Assistant Examiner—An T. Luu
(74) Attorney, Agent, or Firm—Lerner, David, Littenberg, Krumholz & Mentlik, LLP

(57) ABSTRACT

A semiconductor device includes a transmission line bounded by a first buffer and a second buffer. The first and second buffers are placed such that the transmission line has a length between a minimum and a maximum, thereby permitting narrow clock signal pulses to be transmitted with reduced distortion.

27 Claims, 5 Drawing Sheets

LOW POWER CLOCK DISTRIBUTION METHODOLOGY

CROSS REFERENCE TO RELATED APPLICATIONS

This application claims the benefits of U.S. Provisional Patent Application No. 60/297,940, filed Jun. 13, 2001, entitled LOW POWER CLOCK DISTRIBUTION METHODOLOGY, the entire disclosure of which is hereby incorporated by reference.

BACKGROUND OF THE INVENTION

The present invention relates to the distribution of clock signals to various points on a semiconductor device, such as a large scale integrated (LSI) circuit, and more particularly, the present invention relates to the use of optimal length transmission lines in the distribution of such clock signals.

A system clock signal is often used by digital circuitry, such as digital circuitry implemented using an LSI circuit, to synchronously execute certain logic functions. For example, microprocessors employ digital circuitry that use system clock signals to synchronously execute logic functions. Microprocessors may operate at system clock frequencies of 1 GHz or more. The system clock signal of a given LSI circuit is often split into many paths to service many different portions of the digital circuitry. Ideally, the system clock signals at different portions of the digital circuitry exhibit exactly the same timing characteristics so that the different portions of the digital circuit operate in exact synchronization. In practice, however, the system clock signals at various points throughout the digital circuitry exhibit different timing characteristics, such as differing rising and/or falling edges, differing duty cycles, and/or differing frequencies. These non-ideal characteristics are often referred to as clock jitter and clock skew.

Clock jitter relates to the inaccuracies inherent in generating the system clock signal. The non-ideal characteristics of the system clock signals due to clock jitter affect all portions of the LSI circuit in the same way, irrespective of how the system clock signals are distributed to those portions of the circuit. Clock skew relates to the inaccuracies introduced into the system clock signals by the distribution technique employed to split the system clock into many paths and deliver the clock signals to different portions of the digital circuit.

Clock signals are conventionally distributed to various portions of the digital circuitry using signal wires. The signal wires, which may be formed of a metal such as copper or aluminum, have inherent, non-ideal properties associated with them. These properties include, for example, inductance, capacitance, resistance, impedance and conductance. These properties can affect how much power is dissipated when signal currents flow through a signal wire. The rise and fall times of the clock signal can also be affected by these properties. Indeed, a clock signal is not an ideal step signal. Rising and/or falling edges (i.e., transitions) of system clock signals are used to provide timing for the digital circuitry. The rise time is the time it takes for a rising edge of a clock signal to transition from a low value to a high value. Similarly, the fall time is the time it takes for a falling edge of a clock signal to transition from a high value to a low value. The rise (or fall) time is referred to herein as $T_{rf}$.

In general, a clock signal wire dissipates power in accordance with the following equation: $C*V_{dd}^2*f$, where C is the total capacitance for the signal wire and buffers on either end of the wire, $V_{dd}$ is the power supply voltage for the clock distribution system, and f is the clock frequency. During $T_{rf}$, the wire capacitance is pre-charged or discharged, and much of the power lost by the clock signal is dissipated during these transition times.

At high clock frequencies, such as 1 GHz or more, a significant fraction of the power of the clock signal is dissipated during clock distribution. The use of narrow pulses (i.e., pulses with short $T_{rf}$ times) may theoretically address this problem because less power should be dissipated during clock signal distribution. To date, however, the results of using narrow pulses has not been satisfactory (and therefore not optimally exploited) for on-chip clock signaling because the shapes of narrow pulses may be distorted during transmission along the signal wire.

One method of reducing pulse distortion is to implement the signal wires using transmission lines. This permits the use of narrow clock signal pulses. A transmission line is a transferring medium and structure for an electromagnetic wave, employing one or more signal conductors and one or more ground conductors, in contrast to a typical signal wire that includes a single conductor. Unlike a typical signal wire, a signal on a transmission line propagates as an electromagnetic wave with a velocity that does not depend on, for instance, the inductance, the capacitance, the resistance and/or the conductance of the transmission line. Because these parameters may shape the attenuation of the electromagnetic wave, a narrow clock pulse propagated on an ordinary signal wire may be distorted and/or dissipated whereas the same pulse propagated on a transmission line may not be so affected. Even though the distortion of narrow pulses is reduced when a transmission line is employed, clock signals can be adversely affected by the length of the transmission line and how the line is split into branches.

Transmission lines may be used to address the problems associated with clock jitter and clock skew; however, in order to achieve this, a transmission line should be carefully designed. Preferably, the transmission line should be as straight as possible, as any bend in the line can cause change in wire impedance, which in turn may cause a reflection of the clock signal. Unfortunately, the distribution paths providing clock signals to different portions of a digital circuit are rarely straight. A solution to this problem is to place repeater buffers along the transmission line at points where the line bends. Buffers act to regenerate clock signals and provide uniform delay across the digital circuitry.

The clock signal transmitted from a first buffer to a second buffer along a signal line is called an incident wave. Each buffer has an input for receiving the incident wave and an output. The impedance of each input and output should be carefully matched with the impedance of the transmission line in order to avoid ringing. For example, ringing occurs when an incident wave propagates along the transmission line from the output of the first buffer to the input of the second buffer, and a mismatch in impedance at the input of the second buffer results in a portion of the incident wave being reflected, which is called a first reflected wave. The first reflected wave travels back from the input of the second buffer to the output of the first buffer. Further ringing occurs when an impedance mismatch at the output of the first buffer results in a portion of the first reflected wave being reflected, which is called a second reflected wave. The second reflected wave travels from the output of the first buffer to the input of the second buffer. This ringing repeats until the power of the reflected waves is dissipated.

Unfortunately, the results of using transmission lines in clock distribution on an LSI circuit have been unsatisfactory because, among other problems, ringing has been common and efforts to eliminate such ringing have been unsuccessful. Indeed, ringing has caused loss of signal propagation through buffer stages and has even caused damage to the buffer stages thereby rendering the digital circuitry at least partially inoperable. Accordingly, there is a need for a new clock distribution method and apparatus that addresses the ringing problem, as well as other problems, particularly in an LSI application.

SUMMARY OF THE INVENTION

In accordance with one or more aspects of the present invention, an integrated circuit, includes a first clock distribution buffer having an input node and an output node, the first clock distribution buffer being operable to produce an incident signal at the output node thereof from an input signal at the input node thereof; a transmission line having first and second ends defining a length, the first end being coupled to the output node of the first clock distribution buffer such that the incident signal propagates along the length of the transmission line from the first end to the second end; and a second clock distribution buffer having an input node and an output node, the input node being coupled to the second end of the transmission line, the second clock distribution buffer being operable to produce an output signal at the output node thereof from the incident signal on the input node thereof, where a first reflected signal is produced at the input node thereof and propagates along the length of the transmission line from the second end toward the first end.

The length of the transmission line preferably has a value such that a combined voltage level of the incident signal and the first reflected signal at the second end of the transmission line does not exceed about a maximum voltage level. The transmission line has a characteristic impedance ($Z_0$) and a resistance (R), the output node of the first clock distribution buffer has an output impedance ($Z_s$), the first and second clock distribution buffers have a supply voltage $V_{dd}$, and the maximum voltage level may be expressed substantially as:

$$V_{dd} * [Z_0/(Z_0+Z_s)].$$

The first and second clock distribution buffers may have a supply voltage, and the maximum voltage level is preferably about equal to the supply voltage.

The incident signal at the second end of the transmission line preferably has a voltage level that is at least about one-fourth of the maximum voltage level. The voltage level of the incident signal is preferably between about one-fourth of the maximum voltage level and about one-half of the maximum voltage level.

The transmission line may include one or more of strip lines, stacked-pair lines, double-sided stacked-pair lines, double-sided stacked-pair lines with a lateral return path, micro-strip lines and groove lines. The transmission line, first clock distribution buffer and second clock distribution buffer are preferably part of a clock distribution architecture, such as an H-tree, an X-tree and/or an RC-balanced architecture.

The input clock signal preferably comprises a narrow pulse.

In accordance with one or more further aspects of the present invention, the length of the transmission line may have a value such that the incident signal exceeds a minimum threshold voltage of the input node of the second clock distribution buffer. Preferably, the minimum threshold voltage is at least about one-fourth of a maximum voltage level.

The first and second clock distribution buffers may have a supply voltage, and the maximum voltage level may be substantially equal to the supply voltage. The incident signal may be between about one-fourth the maximum voltage level and about one-half the maximum voltage level.

In accordance with one or more further aspects of the present invention, the output node may have an output impedance ($Z_s$), the length of the transmission line may have a characteristic impedance ($Z_0$) and a resistance (R), and the length of the transmission line preferably exceeds a minimum length ($d_1$), where the minimum length may be expressed as:

$$d_1 = 2*(Z_0/R)\ln[(2*Z_0)/(Z_0+Z_s)].$$

Preferably, the length of the transmission line is less than a maximum length ($d_2$), and the maximum length may be expressed substantially as:

$$d_2 = 2*(Z_0/R)\ln[(4*Z_0)/(Z_0+Z_s)].$$

The incident signal may have a rise time ($T_{rf}$), the length of the transmission line may have an inductance (L) and a capacitance (C), and the rise time is preferably limited in a way that may be expressed substantially by:

$$T_{rf} < 2\sqrt{LC}*(Z_0/R)\ln[4*Z_0/(Z_0+Z_s)].$$

In accordance with one or more further aspects of the invention, the length of the transmission line preferably does not exceed a maximum length ($d_2$), where the maximum length may be expressed substantially by:

$$d_2 = 2*(Z_0/R)\ln[(4*Z_0)/(Z_0+Z_s)].$$

In accordance with one or more further aspects of the present invention, a method of distributing clock signals along a transmission line of an integrated circuit having first and second ends defining a length, receiving an input clock signal at an input node of a first clock buffer; producing an incident signal at an output node of the first clock buffer based upon the input clock signal, the output node being coupled to the first end of the transmission line; and transmitting the incident signal along the transmission line from the first end to the second end, the second end being coupled to an input node of a second clock buffer, the second clock buffer being operable to produce an output signal on an output node thereof from the incident signal on the input node thereof, wherein the length has a value such that a combined voltage level of the incident signal and a first reflected signal at the second end of the transmission line does not exceed a maximum voltage level.

The transmission line preferably has a characteristic impedance ($Z_0$) and a resistance (R), the output node of the first clock buffer preferably has an output impedance ($Z_s$), the first and second clock buffers have a supply voltage $V_{dd}$, and the maximum voltage level may be expressed substantially as:

$$V_{dd} * [Z_0/(Z_0+Z_s)].$$

The length of the transmission line preferably exceeds a minimum length ($d_1$), where the minimum length may be expressed substantially as:

$$d_1 = 2*(Z_0/R)\ln[(2*Z_0)/(Z_0+Z_s)].$$

The length of the transmission line is preferably less than a maximum length ($d_2$), where the maximum length may be expressed substantially as:

$$d_2=2*(Z_0/R)\ln[(4*Z_0)/(Z_0+Z_s)].$$

The incident signal may have a rise time ($T_{rf}$) the length of the transmission line may have an inductance (L), a capacitance (C), a characteristic impedance ($Z_0$) and a resistance (R), the output node of the first clock buffer may have an output impedance ($Z_s$), and the rise time may be limited in a way that may be expressed substantially by:

$$T_{rf}<2\sqrt{LC}*(Z_0/R)\ln[4*Z_0/(Z_0+Z_s)].$$

Other features and advantages of the present invention will become apparent in light of the description herein taken in combination with the accompanying drawings.

DETAILED DESCRIPTION

It has been discovered that ringing and other problems can occur if the length of a transmission line between two buffers is too short or too long. For example, if the wire length of the transmission line is too short, the combined voltage level of the incident wave and the first reflected wave may exceed $V_{dd}$ of the second buffer, thereby damaging the buffer. Therefore, there is a need for optimal length transmission lines for efficient low power on-chip clock signal distribution.

Figure 1A:
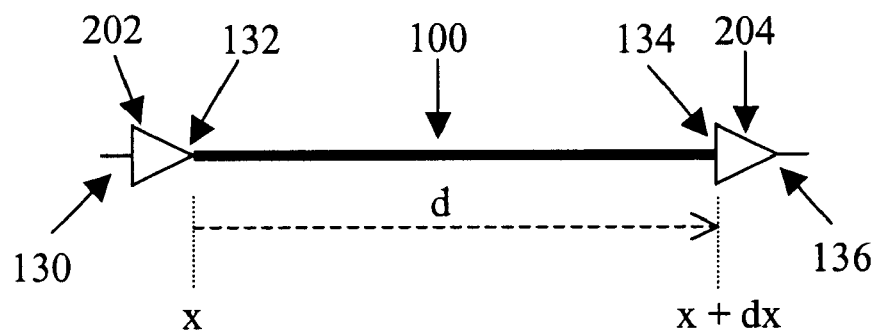
FIG. 1A is a schematic diagram of a portion of a clock distribution system in accordance with one or more aspects of the present invention.

Referring now to the drawings, wherein like numerals indicate like elements, there is shown in FIG. 1A a portion of a clock distribution system that includes a first clock distribution buffer 202, a second clock distribution buffer 204 and a transmission line 100 therebetween. The first clock distribution buffer 202 includes an input node 130 and an output node 132, and the second clock distribution buffer 204 includes an input node 134 and an output node 136. The transmission line 100 includes first and second ends defining a length, d. The first end of the transmission line 100 is coupled to the output node 132 of the first clock distribution buffer 202. The second end of the transmission line 100 is coupled to the input node 134 of the second clock distribution buffer 204.

The first clock distribution buffer 202 is preferably operable to produce an incident signal at the output node 132 in response to an input signal at the input node 130. The second clock distribution buffer 204 is preferably operable to produce an output signal at the output node 136 in response to the incident signal at the input node 134, where the incident signal at the input node 134 has propagated along the transmission line 100 from the output node 132 of the first clock distribution buffer 202.

In accordance with at least one aspect of the present invention, the length d of the transmission line 100 preferably exceeds about a minimum length ($d_{min}$) where this minimum length may be expressed substantially as: $d_{min}= 2*(Z_0/R)\ln[(2*Z_0)/(Z_0+Z_s)]$. In accordance with this equation, the output node 132 of the first clock distribution buffer 202 has an output impedance $Z_s$, and the transmission line 100 has a characteristic impedance $Z_0$ and a resistance R. Indeed, it has been discovered that undesirable consequences from the incident signal of the first clock distribution buffer 202 adding with a first reflected signal from the input node 134 of the second clock distribution buffer 204 may be avoided when the length of the transmission line 100 exceeds about the minimum length $d_{min}$. Further details concerning this advantageous property of the present invention will now be described.

Figure 1B:
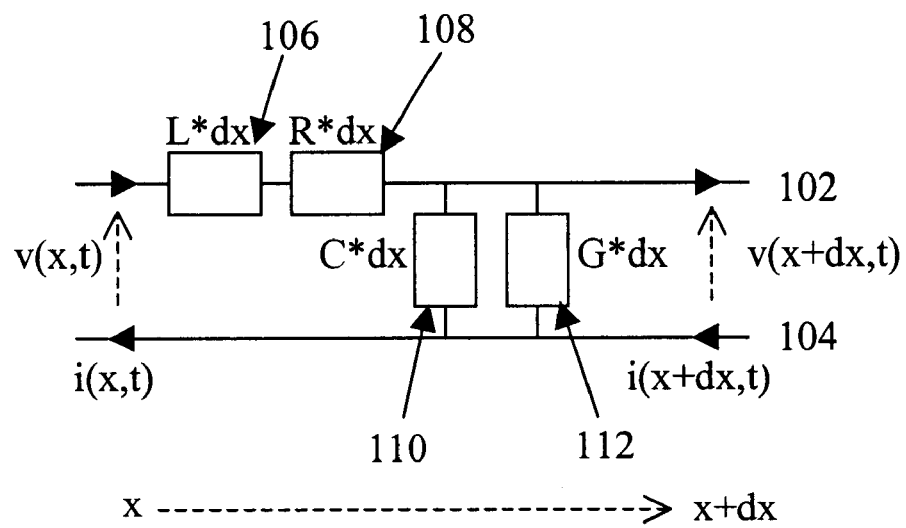
FIG. 1B is an illustration of a transmission line model suitable for use in accordance with one or more aspects of the present invention.

With reference to FIG. 1B, a model of the transmission line 100 in accordance with the present invention is shown. The transmission line 100 is modeled as having a forward path 102 and a return path 104. The forward path 102 and the return path 104 are defined by a start point (x) and an end point (x+dx). The start and end points, x and x+dx, may terminate at, for example, the first buffer 202 and the second buffer 204.

The clock signal is an electromagnetic wave that travels along the transmission line 100 between start point x and end point x+dx. The voltage (v) and current (i) of the clock signal can be determined for any time (t). The voltage, v, of the transmission line 100 at point x (for time t) is represented as v(x,t). Similarly, the voltage, V, of the transmission line 100 at point x+dx (for time t) is represented as v(x+dx,t). The differential voltage (e.g., the voltage at a given point on the transmission line 100) is expressed as dv/dx. The current, i, through the transmission line 100 at point x (for time t) is represented as i(x,t). The current, i, through the transmission line 100 at point x+dx (for time t) is represented as i(x+dx,t). The differential current (e.g., the current through the transmission line 100 at a given point) is expressed as di/dx.

The transmission line 100 is characterized by an inductance (L) 106, a resistance (R) 108, a capacitance (C) 110 and a conductance (G) 112. The differential voltage, dv/dx, and the differential current, di/dx, can be expressed by the following equations:

$$dv/dx = -(R+j\omega L)*i \quad (1)$$

$$di/dx = -(G+j\omega C)*v \quad (2)$$

where $\omega$ is the angular frequency of the clock signal. Using equations 1 and 2, the voltage v(x) and current i(x) along the transmission line 100 can be expressed as follows:

$$v(x) = V_1 e^{(-\gamma x)} + V_2 e^{(\gamma x)} \quad (3)$$

$$i(x) = (V_1 e^{(-\gamma x)} + V_2 e^{(\gamma x)})/Z_0, \quad (4)$$

where $\gamma$ is the propagation constant, and is defined in equation 5 below. $V_1 e^{(-\gamma x)}$ is an incident wave, traveling from start point x to end point x+dx along, for example, the forward path 102. $V_2 e^{(\gamma x)}$ is a reflected wave, traveling from end point x+dx to start point x along, for example, the return path 104. $Z_0$ is the characteristic impedance of the transmission line 100, and is defined in equation 6 below.

$$\gamma = \sqrt{(R+j\omega L)(G+j\omega C)} \qquad (5)$$

$$Z_0 = \sqrt{(R+j\omega L)/(G+j\omega C)} \qquad (6)$$

Referring again to FIG. 1A, the transmission line 100 is defined by the first end (e.g., at location x) adjacent the first buffer 202 and the second end (e.g., at location x+dx) adjacent the second buffer 204. The voltage v(x) along the transmission line 100 can be expressed in accordance with the following equation:

$$v(x) = V_{dd} * [Z_0/(Z_0+Z_s)] * e^{(-R*(1/2)*(1/Z_0)*x)} \qquad (7)$$

where the first buffer 202 has an output impedance $Z_s$, and the first buffer 202 and second buffer 204 are powered by supply voltage $V_{dd}$. According to equation 7, the voltage v(x) along the transmission line 100 attenuates exponentially as the distance increases away from the first buffer 202.

Figure 2A:
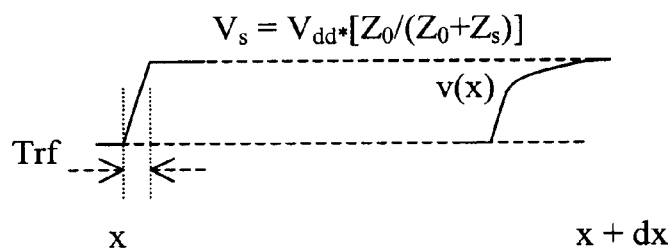
FIGS. 2A–B are illustrations of voltage waves that may propagate along the transmission line in accordance with one or more aspects of the present invention.

FIG. 2A illustrates the voltage v(x) as the incident signal (or wave) propagates from the first buffer 202 to the second buffer 204. The voltage of the incident signal increases from a minimum voltage (e.g., zero volts) to a maximum voltage, $V_s$, in time $T_{rf}$. The maximum voltage $V_s$, also known as the incident step voltage, is substantially equal to $V_{dd}*[Z_0/(Z_0+Z_s)]$. As the incident signal propagates along transmission line 100, $V_s$ attenuates according to equation 7.

Figure 2B:
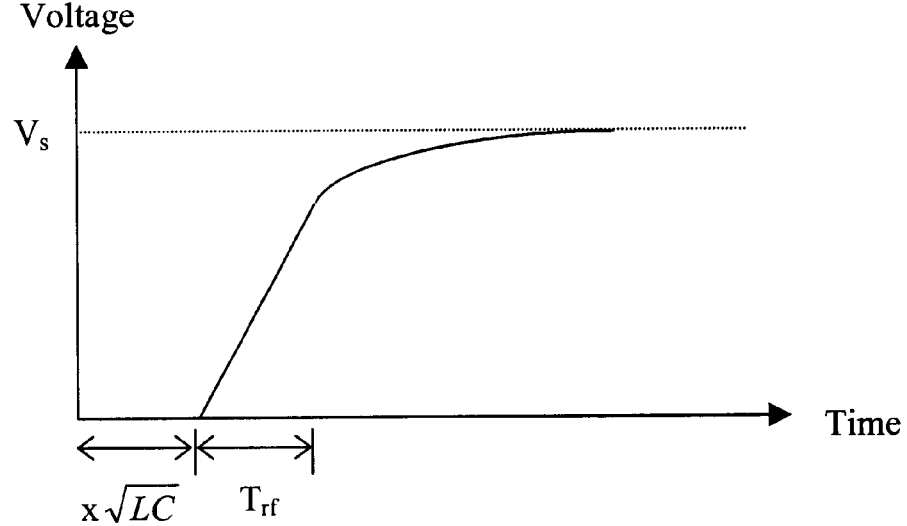

FIG. 2B illustrates the voltage wave shape of the incident signal for point x on the transmission line 100 as time t progresses. The rising edge of the incident signal moves forward with a velocity of about $1/\sqrt{LC}$. The edge of the voltage waveform of the incident signal reaches point x on the transmission line 100 at about time $t=x\sqrt{LC}$. Then, the incident signal rises for a about period of time $T_{rf}$, with a maximum voltage of about $V_s$.

As discussed above, a first reflected wave can form at the junction of the second end of the transmission line 100 and the second buffer 204. The combined maximum voltage of the incident wave and the first reflected wave at the input node 134 of the second buffer 204 is about 2*v(x). The maximum length in which the incident wave behaves as a digital signal ($d_{max}$) is obtained by comparing v(x) to a threshold voltage ($V_{th}$) of the input to the second buffer 204. If the voltage level of a signal does not exceed $V_{th}$, the signal may not be propagated to the next transmission line 100. Therefore, the voltage level must be higher than $V_{th}$ to be treated as a "digital" signal. The threshold voltage $V_{th}$ is substantially equal to $V_{dd}/2$. $V_{th}$ may be slightly higher or lower depending upon the type of circuitry employed in the buffers.

In accordance with one or more further aspects of the present invention, the length of the transmission line 100 has a length such that the combined voltage of the incident wave and the first reflected wave at the second end of the transmission line 100 does not exceed about a maximum voltage level. Indeed, if the voltage level of the incident wave plus the first reflected wave exceeds $V_{dd}$, the second buffer 204 can be damaged. This is related to $d_{min}$ in that this damage can occur when the length of the transmission line 100 is shorter than about $d_{min}$. Therefore, the length of transmission line 100 between first buffer 202 and second buffer 204 is preferably longer than about $d_{min}$. $d_{min}$ can thus be expressed according to equation 8, which solves equation 7.

$$d_{min} = 2*(Z_0/R)\ln[(2*Z_0)/(Z_0+Z_s)] \qquad (8)$$

In accordance with at least one further aspect of the present invention, the length of the transmission line 100 preferably has a value such that the incident signal exceeds about a minimum threshold voltage of the input node 134 of the second clock distribution buffer 204. Indeed, it has been discovered that in order to avoid voltage ringing at the output of the second buffer 204, the incident voltage needs to exceed about $V_{dd}/4$. To this end, and in accordance with one or more further aspects of the present invention, the length of the transmission line 100 does not exceed about the maximum length $d_{max}$. $d_{max}$ is determined by comparing $V_{th}$ to the combination of the incident and first reflected waves. $d_{max}$ may be expressed substantially by the following equation:

$$d_{max} = 2*(Z_0/R)\ln[(4*Z_0)/(Z_0+Z_s)] \qquad (9)$$

Keeping the length of transmission line 100 less than $d_{max}$ acts to prevent the voltage ringing at the input of the second buffer 204. Preferably, in accordance with one or more further aspects of the present invention, the transmission line 100 has a length between the first buffer 202 and the second buffer 204 of at least about $d_{min}$, but less than about $d_{max}$, to provide desirable operating conditions. In achieving these constraints, the value for $Z_0$ should be high relative to the value for R.

Figure 3A:
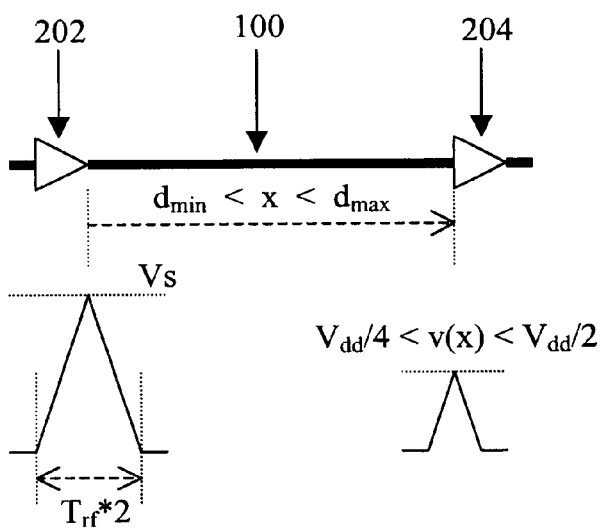
FIG. 3A is an illustration of an on-chip signal transmission line having an incident wave at a point between two buffers on the transmission line in accordance with one or more aspects of the present invention.

FIG. 3A illustrates transmission line 100 having a length between $d_{min}$ and $d_{max}$. The voltage is a maximum at the output to the first buffer 202, having a maximum value equal to incident step voltage $V_s$. At the input to the second buffer 204, the voltage of the incident wave is between $V_{dd}/4$ and $V_{dd}/2$. The time period of the incident wave is $2*T_{rf}$. A signal transition from a low or high voltage to $V_{dd}/2$ requires a time of $T_{rf}/2$. Recall that the edge of the incident signal reaches point x at time $t=x\sqrt{LC}$. Using this information, and restricting x to less than $d_{max}$, $T_{rf}$ is preferably limited according to equation 10 below.

$$T_{rf} < 2\sqrt{LC}*(Z_0/R)\ln[4*Z_0/(Z_0+Z_s)] \qquad (10)$$

Figure 3B:
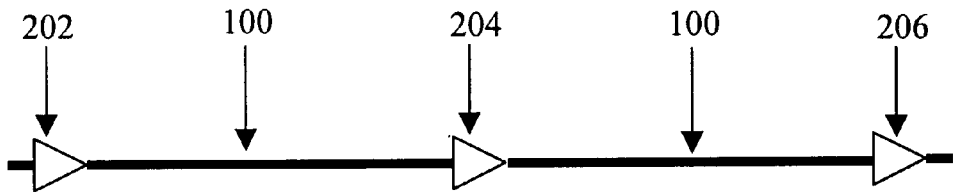
FIG. 3B is an illustration of a pair of transmission lines in accordance with one or more aspects of the present invention.

FIG. 3B illustrates a pair of transmission lines 100. One transmission line 100 has the first buffer 202 at the first end and the second buffer 204 at the second end. The other transmission line has, as its first buffer, buffer 204 at the first end, and has buffer 206 as its second buffer at the second end. The transmission line length requirements $d_{min}$ and $d_{max}$ are preferably employed for each transmission line 100.

As noted above, a transmission line includes at least one signal wire and at least one separate current return path. The constraints of $d_{min}$ and $d_{max}$ can be implemented in a wide variety of transmission line types, as shown in FIGS. 4A–F. One useful type of transmission line is an orthogonal structure. FIGS. 4A–4D illustrate several types of orthogonal transmission lines structures that are suitable for use in accordance with one or more aspects of the present invention. It is understood, however, that the types of structures shown are given by way of example only and neither limit the present invention nor represent an exhaustive set of suitable structures. In orthogonal transmission line structures, the current return path(s) is on a plane above or below the plane containing the signal wire.

Figure 4A:
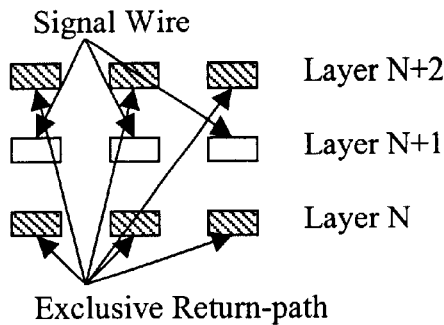
FIGS. 4A–F are cross-sectional schematic illustrations of six on-chip transmission line models suitable for use in accordance with one or more aspects of the present invention.

FIG. 4A illustrates a cross-sectional view of an orthogonal structure with three layers. Layer N+1 comprises three signal wires. Layers N and N+2 are a pair of exclusive return paths for the signal wires. An exclusive return path is typically connected to the source, for example, of an n-channel transistor of a buffer, and is also connected to ground. FIG. 4A is a double-sided stacked pair line.

Figure 4B:
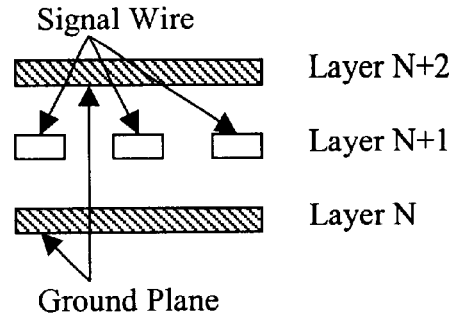

FIG. 4B illustrates another orthogonal structure having three layers. Here, as in FIG. 4A, layer N+1 comprises three signal wires. However, layers N and N+2 are ground planes common to all signal wires in layer N+1. FIG. 4B is a strip line.

Figure 4C:
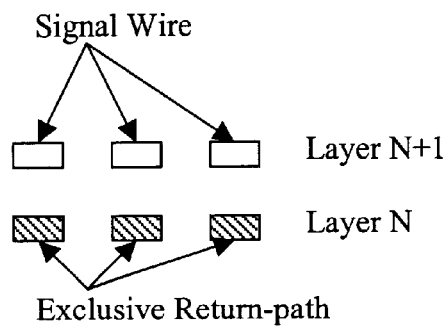

FIG. 4C illustrates another orthogonal structure, this time having two layers. Layer N+1 comprises three signal wires, and layer N comprises exclusive return paths for each signal wire. FIG. 4C is a stacked pair line.

Figure 4D:
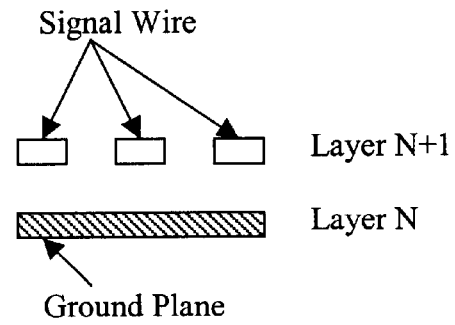

FIG. 4D illustrates another two-layer orthogonal structure. Three signal wires form layer N+1. The return path is a common ground plane at layer N. FIG. 4D is a micro-strip line.

Figure 4E:
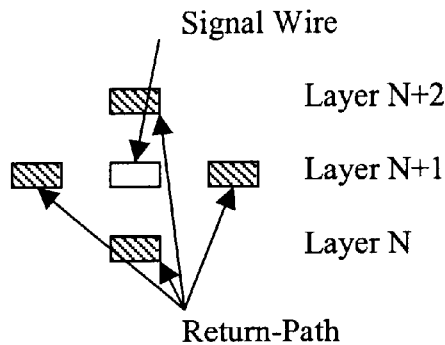

A second type of transmission line suitable for use in accordance with the present invention is a lateral structure. FIG. 4E illustrates one kind of lateral transmission line structure. Lateral structures have signal wires placed on a plane with space separating them. In a given lateral structure, there may or may not be a lateral current return path. Lateral return paths can be placed on either side of the signal wire. If no lateral return path is provided, the signal wires are preferably spaced far enough to avoid crosstalk.

Orthogonal and lateral structures can be employed together in transmission line architecture. FIG. 4E illustrates a cross-sectional view of a double-sided stacked pair transmission line structure having lateral return paths. The signal wire is on layer N+1, with return paths on either side. Additional current return paths are provided on layers N and N+2.

Figure 4F:
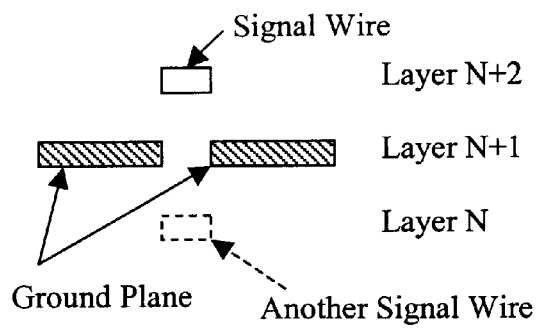

FIG. 4F illustrates a cross-sectional view of another transmission line structure, called a groove transmission line. Here, the signal wire is on layer N+2. The ground plane, located on layer N+1, has a grooved structure splitting the wire into two segments. This grooved structure may act to increase $d_{max}$ by controlling the value of $Z_0$. As shown by the dashed box, an additional signal wire may be added in layer N.

Note that the number of signal wires or return paths in any given layer is merely illustrative in these figures, and should not be construed as limiting the implementation of the present invention. These structures can be implemented with the length constraints discussed above to provide optimal length transmission lines that can be used with narrow clock pulses. Buffers are preferably placed where the transmission line bends. The overall architecture can be designed such that total path length to different portions of the overall digital circuit is the same, thereby minimizing clock skew. Length-balanced structures with symmetric routing, such as H-trees or X-trees can be employed.

Figure 5A:
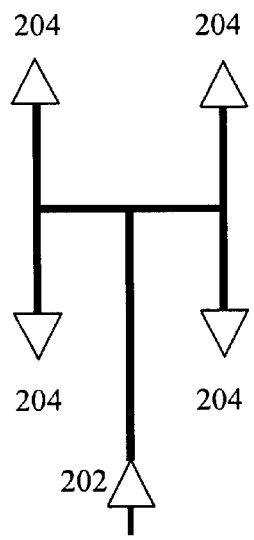
FIGS. 5A–C are illustrations of transmission line architectures suitable for use in accordance with one or more aspects of the present invention.
Figure 5B:
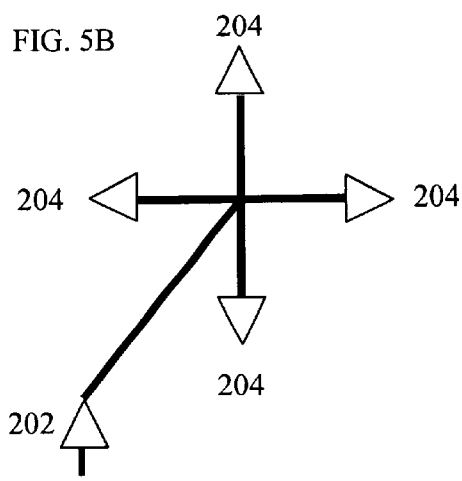
Figure 5C:
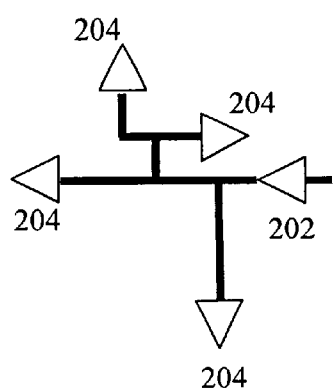

FIGS. 5A–B illustrate H- and X-tree transmission line structures, respectively, that may be employed in accordance with one or more aspects of the present invention. The H-tree of FIG. 5A has a first buffer 202 and four second buffers 204 at endpoints along the H. The X-tree of FIG. 5B has a first buffer 202 and four second buffers 204 at endpoints along the X. Alternatively, in place of H- or X-tree structures, an RC-balanced architecture may be employed having equivalent wire lengths for sets of clock signal lines. FIG. 5C illustrates such an RC-balanced architecture, having a first buffer 202 and four second buffers 204 with equivalent wire lengths.

In accordance with at least one further aspect of the present invention, methods for distributing clock signals throughout an integrated circuit are contemplated by the invention. These methods may be achieved utilizing suitable hardware, such as that illustrated above in FIGS. 1A–5C. The steps and/or actions of these methods preferably correspond to at least some of the functions and features described hereinabove with respect to that hardware.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. An integrated circuit, comprising:
   a first clock distribution buffer having an input node and an output node, the first clock distribution buffer being operable to produce an incident signal at the output node thereof from an input signal at the input node thereof;
   a transmission line having first and second ends defining a length, the first end being coupled to the output node of the first clock distribution buffer such that the incident signal propagates along the length of the transmission line from the first end to the second end; and
   a second clock distribution buffer having an input node and an output node, the input node being coupled to the second end of the transmission line, the second clock distribution buffer being operable to produce an output signal at the output node thereof from the incident signal on the input node thereof, where a first reflected signal is produced at the input node thereof and propagates along the length of the transmission line from the second end toward the first end,
   wherein the length of the transmission line has a value such that a combined voltage level of the incident signal and the first reflected signal at the second end of the transmission line does not exceed about a maximum voltage level.

2. The integrated circuit of claim 1, wherein the first and second clock distribution buffers have a supply voltage, and the maximum voltage level is substantially equal to the supply voltage.

3. The integrated circuit of claim 1, wherein the incident signal at the second end of the transmission line has a voltage level that is at least about one-fourth of the maximum voltage level.

4. The integrated circuit of claim 3, wherein the voltage level of the incident signal is between about one-fourth of the maximum voltage level and about one-half of the maximum voltage level.

5. The integrated circuit of claim 1, wherein the transmission line is taken from the group consisting of strip lines, stacked-pair lines, double-sided stacked-pair lines, double-sided stacked-pair lines with a lateral return path, micro-strip lines and groove lines.

6. The integrated circuit of claim 1, wherein the transmission line, first clock distribution buffer and second clock distribution buffer are part of a clock distribution architecture taken from the group consisting of an H-tree, an X-tree and an RC-balanced architecture.

7. The integrated circuit of claim 1, wherein the transmission line has a characteristic impedance ($Z_O$) and a resistance (R), the output node of the first clock distribution buffer has an output impedance ($Z_s$), the first and second clock distribution buffers have a supply voltage $V_{dd}$, and the maximum voltage level may be expressed substantially as:

$$V_{dd}*[Z_O/(Z_O+Z_s)].$$

8. The integrated circuit of claim 1, wherein the input signal comprises a narrow pulse of substantially less than 50 percent duty cycle.

9. An integrated circuit, comprising:
a first clock distribution buffer having an input node and an output node, the first clock distribution buffer being operable to produce an incident signal at the output node thereof from an input signal at the input node thereof, the incident signal having an incident voltage;
a transmission line having first and second ends defining a length, the first end being coupled to the output node of the first clock distribution buffer such that the incident signal propagates along the length of the transmission line from the first end to the second end; and
a second clock distribution buffer having an input node and an output node, the input node being coupled to the second end of the transmission line, the second clock distribution buffer being operable to produce an output signal at the output node thereof from the incident signal on the input node thereof, where a first reflected signal is produced at the input node thereof and propagates along the length of the transmission line from the second end toward the first end,
wherein the length of the transmission line has a value such that the incident signal exceeds about a minimum threshold voltage of the input node of the second clock distribution buffer, the minimum threshold voltage being at least about one-fourth of a maximum voltage level.

10. The integrated circuit of claim 9, wherein the first and second clock distribution buffers have a supply voltage, and the maximum voltage level is substantially equal to the supply voltage.

11. The integrated circuit of claim 9, wherein the incident signal is between about one-fourth the maximum voltage level and about one-half the maximum voltage level.

12. The integrated circuit of claim 9, wherein the transmission line is taken from the group consisting of strip lines, stacked-pair lines, double-sided stacked-pair lines, double-sided stacked-pair lines with a lateral return path, micro-strip lines and groove lines.

13. The integrated circuit of claim 9, wherein the transmission line, first clock distribution buffer and second clock distribution buffer are part of a clock distribution architecture taken from the group consisting of an H-tree, an X-tree and an RC-balanced architecture.

14. The integrated circuit of claim 9, wherein the input signal comprises a narrow pulse of substantially less than 50 percent duty cycle.

15. An integrated circuit, comprising:
a first clock distribution buffer having an input node and an output node, the output node having an output impedance ($Z_s$), the first clock distribution buffer being operable to produce an incident signal at the output node thereof from an input signal at the input node thereof;
a transmission line having first and second ends defining a length, the first end being coupled to the output node of the first clock distribution buffer such that the incident signal propagates along the length of the transmission line from the first end to the second end, the length of the transmission line having a characteristic impedance ($Z_0$) and a resistance (R); and
a second clock distribution buffer having an input node and an output node, the input node being coupled to the second end of the transmission line, the second clock distribution buffer being operable to produce an output signal at the output node thereof from the incident signal on the input node thereof,
wherein the length of the transmission line exceeds about a minimum length ($d_1$), and the minimum length may be expressed substantially as:

$$d_1 = 2*(Z_0/R)\ln[(2*Z_0)/(Z_0+Z_s)].$$

16. The integrated circuit of claim 15, wherein the transmission line is taken from the group consisting of strip lines, stacked-pair lines, double-sided stacked-pair lines, double-sided stacked-pair lines with a lateral return path, micro-strip lines and groove lines.

17. The integrated circuit of claim 15, wherein the length of the transmission line is less than about a maximum length ($d_2$), and the maximum length may be expressed substantially as:

$$d_2 = 2*(Z_0/R)\ln[(4*Z_0)/(Z_0+Z_s)].$$

18. The integrated circuit of claim 15, wherein the incident signal has a rise time ($T_{rf}$), the length of the transmission line has an inductance (L) and a capacitance (C), and the rise time is limited in a way that may be expressed substantially as:

$$T_{rf} < 2\sqrt{LC}*(Z_0/R)\ln[4*Z_0/(Z_0+Z_s)].$$

19. The integrated circuit of claim 15, wherein the transmission line, the first clock distribution buffer and the second clock distribution buffer are part of a clock distribution architecture taken from the group consisting of an H-tree, an X-tree and an RC-balanced architecture.

20. The integrated circuit of claim 15, wherein $Z_0$ has a high value relative to a low value for R.

21. The integrated circuit of claim 15, wherein the input signal comprises a narrow pulse of substantially less than 50 percent duty cycle.

22. A method of distributing clock signals along a transmission line of an integrated circuit having first and second ends defining a length, the method comprising:
receiving an input clock signal at an input node of a first clock buffer;
producing an incident signal at an output node of the first clock buffer based upon the input clock signal, the output node being coupled to the first end of the transmission line; and
transmitting the incident signal along the transmission line from the first end to the second end, the second end being coupled to an input node of a second clock buffer, the second clock buffer being operable to produce an output signal on an output node thereof from the incident signal on the input node thereof,
wherein the length has a value such that a combined voltage level of the incident signal and a first reflected signal at the second end of the transmission line does not exceed about a maximum voltage level.

23. The method of distributing clock signals according to claim 22, wherein the transmission line has a characteristic impedance ($Z_0$) and a resistance (R), the output node of the first clock buffer has an output impedance ($Z_s$), the first and second clock buffers have a supply voltage $V_{dd}$, and the maximum voltage level may be expressed substantially as:

$$V_{dd}*[Z_0/(Z_0+Z_s)].$$

24. The method of distributing clock signals according to claim 22, wherein the transmission line has a characteristic impedance ($Z_0$) and a resistance (R), the output node of the first clock buffer has an output impedance ($Z_s$), the length of the transmission line exceeds about a minimum length ($d_1$), and the minimum length may be expressed substantially as:

$$d_1 = 2*(Z_0/R)\ln[(2*Z_0)/(Z_0+Z_s)].$$

25. The method of distributing clock signals according to claim 22, wherein the transmission line has a characteristic impedance ($Z_0$) and a resistance (R), the output node of the first clock buffer has an output impedance ($Z_s$), the length of the transmission line is less than about a maximum length ($d_2$), and the maximum length may be expressed substantially as:

$$d_2 = 2*(Z_0/R)\ln[(4*Z_0)/(Z_0+Z_s)].$$

26. The method of distributing clock signals according to claim 22, wherein the incident signal has a rise time ($T_{rf}$), the length of the transmission line has an inductance (L), a capacitance (C), a characteristic impedance ($Z_0$) and a resistance (R), the output node of the first clock buffer has an output impedance ($Z_s$), and the rise time is limited in a way that may be expressed substantially by:

$$T_{rf} < 2\sqrt{LC}*(Z_0/R)\ln[4*Z_0/(Z_0+Z_s)].$$

27. The method of distributing clock signals according to claim 22, wherein the input clock signal comprises a narrow pulse of substantially less than 50 percent duty cycle.

* * * * *